United States Patent
Liu et al.

(10) Patent No.: US 10,097,737 B2
(45) Date of Patent: Oct. 9, 2018

(54) IMAGE CAPTURE SYSTEM AND METHOD FOR SYNCHRONIZING IMAGE

(71) Applicant: VIVOTEK INC., New Taipei (TW)

(72) Inventors: Cheng-Chieh Liu, New Taipei (TW); Chao-Ming Chang, New Taipei (TW); Wei-Ming Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/472,261

(22) Filed: Mar. 28, 2017

(65) Prior Publication Data
US 2017/0295301 A1 Oct. 12, 2017

(30) Foreign Application Priority Data
Apr. 8, 2016 (TW) .............................. 105111101 A (51) Int. Cl.
| | |
|---|---|
| *H04N 5/04* | (2006.01) |
| *G06T 7/70* | (2017.01) |
| *H04N 7/18* | (2006.01) |
| *G08B 13/196* | (2006.01) |
| *H04N 1/00* | (2006.01) |
| *G06T 7/292* | (2017.01) |

(52) U.S. Cl.
CPC .............. *H04N 5/04* (2013.01); *G06T 7/292* (2017.01); *G06T 7/70* (2017.01); *G08B 13/196* (2013.01); *H04N 1/00114* (2013.01); *H04N 7/181* (2013.01); *G06T 2207/10016* (2013.01); *G06T 2207/30196* (2013.01)

(58) Field of Classification Search
CPC ............. G06T 7/70; H04N 5/04; H04N 7/181
See application file for complete search history.

(56) References Cited

U.S. PATENT DOCUMENTS

| | | | | |
|---|---|---|---|---|
| 2008/0291278 | A1* | 11/2008 | Zhang ................ | G06K 9/00771 348/159 |
| 2012/0120309 | A1* | 5/2012 | Utagawa ................. | H04N 7/18 348/441 |

(Continued)

FOREIGN PATENT DOCUMENTS

| | | |
|---|---|---|
| TW | 200818916 A | 4/2008 |
| TW | 201328358 A | 7/2013 |

(Continued)

*Primary Examiner* — Amy Hsu
(74) *Attorney, Agent, or Firm* — CKC & Partners Co., Ltd.

(57) ABSTRACT

An image capture system includes a first image capture device, a second image capture device and a processing device, and the processing device is electrically connected to the first image capture device and the second image capture device. The first image capture device is configured to capture a first image, and the second image capture device is configured to capture a second image. The processing device is configured to receive first information transmitted from the first image capture device and second information transmitted from the second image capture device, and determines whether the first image and the second image have a same object based on the first information and the second information. If the processing device determines that the first image and the second image have the same object, the processing device synchronizes timestamps of the first image and the second image according to an event of the object.

8 Claims, 4 Drawing Sheets

(56) References Cited

U.S. PATENT DOCUMENTS

| | | | | |
|---|---|---|---|---|
| 2013/0278755 | A1* | 10/2013 | Starns | G01C 11/02 |
| | | | | 348/135 |
| 2015/0015482 | A1 | 1/2015 | Njolstad et al. | |
| 2015/0324636 | A1* | 11/2015 | Bentley | G11B 27/17 |
| | | | | 386/227 |
| 2016/0142644 | A1* | 5/2016 | Lin | H04N 5/23238 |
| | | | | 348/143 |
| 2016/0205341 | A1* | 7/2016 | Hollander | G06T 7/20 |
| | | | | 375/240.08 |
| 2016/0379684 | A1* | 12/2016 | Anderson | G11B 27/11 |
| | | | | 386/227 |
| 2017/0053169 | A1* | 2/2017 | Cuban | H04N 7/185 |
| 2017/0289646 | A1* | 10/2017 | Kanthapanit | H04N 21/8547 |

FOREIGN PATENT DOCUMENTS

| | | |
|---|---|---|
| TW | I430664 B | 3/2014 |
| TW | I539227 B | 6/2016 |
| TW | I542216 B | 7/2016 |

* cited by examiner

IMAGE CAPTURE SYSTEM AND METHOD FOR SYNCHRONIZING IMAGE

RELATED APPLICATIONS

This application claims priority to Taiwan Application Serial Number 105111101, filed Apr. 8, 2016, which is herein incorporated by reference.

BACKGROUND

Field of Invention

The present disclosure relates to an image control system. More particularly, the present disclosure relates to an image capture system and a method for synchronizing an image.

Description of Related Art

In order to achieve wide area surveillance in application scenarios, most of the currently adopted approaches are disposing multiple image capture devices in the application scenario so as to completely capture images in different areas of the application scenario. Since there may exist a timestamp difference between images captured by different image capture devices at the same time, time synchronization needs to be performed between the different image capture devices to correct the difference in the timestamp.

Generally speaking, each of the image capture devices has a clock unit inside, and the clock unit is used for determining the timestamp of the captured image. At present, all the image capture devices having the network function can synchronize the clock units through connection to a network time protocol (NTP) server via the Internet, so as to synchronize the timestamps of the images captured by different image capture devices at the same time to eliminate or reduce the time difference. However, when the time synchronization of the image capture device is performed, discontinuous timestamps between the images can possibly result, which in turn causes the time jump phenomenon.

For the forgoing reasons, there is a need to take into account the reduction of time difference and the reduction of occurrence of discontinuous timestamps by designing an image capture system.

SUMMARY

An image capture system is provided. The image capture system comprises a first image capture device, a second image capture device, and a processing device, and the processing device is electrically connected to the first image capture device and the second image capture device. The first image capture device is configured to capture a first image. The second image capture device is configured to capture a second image. The processing device is configured to receive first information transmitted from the first image capture device and second information transmitted from the second image capture device, and determines whether the first image and the second image have a same object based on the first information and the second information. If the processing device determines that the first image and the second image have the same object, the processing device synchronizes timestamps of the first image and the second image according to an event of the object.

The disclosure provides a method for synchronizing an image. The method for synchronizing the image comprises the following steps: capturing a first image and a second image respectively through a first image capture device and a second image capture device; determining whether the first image and the second image have a same object based on first information and second information; tracking an event of the object when the first image and the second image have the same object; and synchronizing timestamps of the first image and the second image according to the event of the object.

In summary, the technical solution of the present disclosure has obvious advantages and beneficial effects as compared with the prior art. Through the above technical solution, considerable advances in technology and extensive industrial applicability can be achieved. The processing device according to the present disclosure determines whether the captured images have the same object after receiving the image information captured by different image capture devices. If the captured images are determined to have the same object, the processing device tracks the object and modifies the timestamps of the captured images according to an event of the object that subsequently occurs. Therefore, as compared with the method in which all the image capture devices are connected through the Internet to synchronize the timestamps, not only can the image capture system according to the present disclosure effectively correct the time difference between the captured images, but the image capture system according to the present disclosure can also significantly reduce or eliminate the occurrence of discontinuous timestamps so as to maintain a high degree of synchronization between the captured images.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

In the drawings.

DESCRIPTION OF THE EMBODIMENTS

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of devices with equivalent effects are within the scope of the present disclosure. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

Terms used throughout the specification and the claims typically have common meanings for each of the terms used in this field, in the present disclosure and in special contents, unless specially noted. Some terms for describing the present disclosure will be discussed in the following or elsewhere in this specification for providing practitioners with additional guidance related to the description of the present disclosure.

Furthermore, it should be understood that the terms, "comprising", "including", "having", "containing", "involving" and the like, used herein are open-ended, that is, including but not limited to. It will be understood that, as used herein, the phrase "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
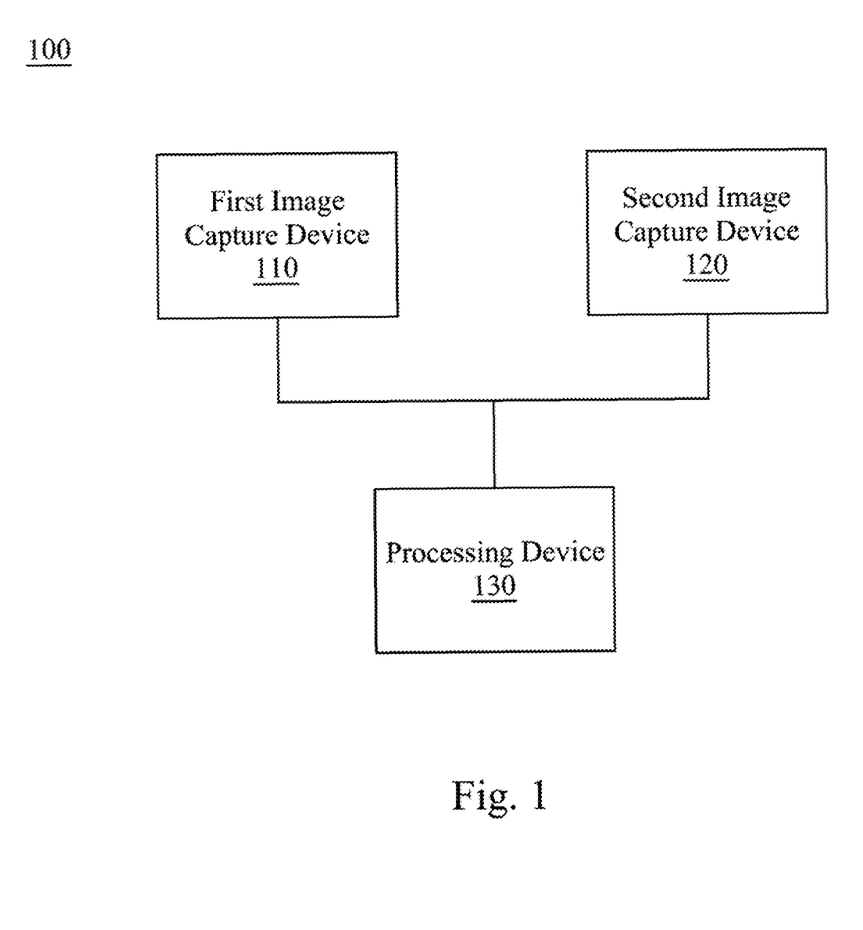
FIG. 1 depicts a block diagram of an image capture system according to some embodiments of this disclosure.

FIG. 1 depicts a block diagram of an image capture system 100 according to some embodiments of this disclosure. As shown in FIG. 1, the image capture system 100 comprises a first image capture device 110, a second image capture device 120, and a processing device 130. The processing device 130 is electrically connected to the first image capture device 110 and the second image capture device 120.

Figure 2A:
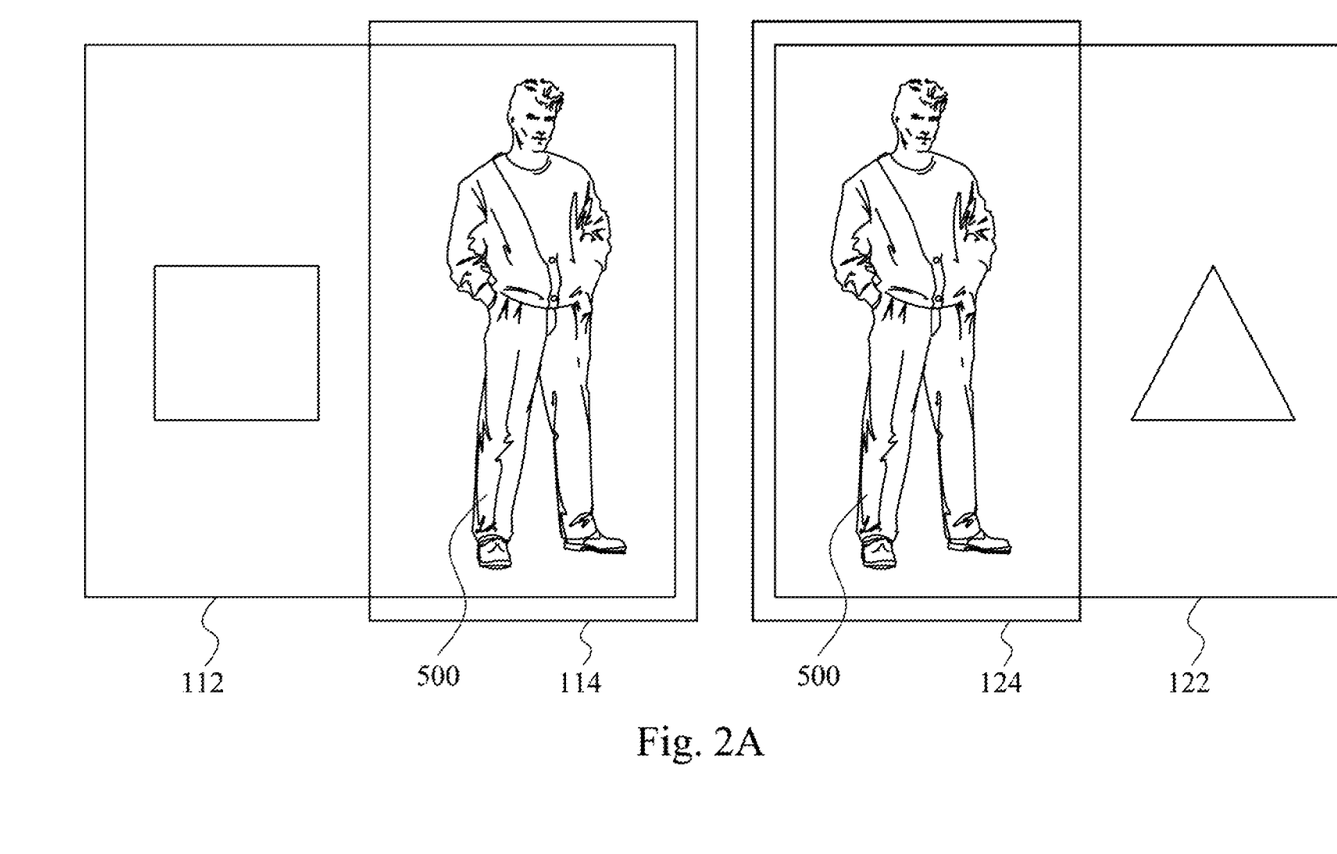
FIG. 2A depicts a schematic diagram of images captured by an image capture system according to some embodiments of this disclosure.

In order to facilitate understanding the relative relationship between images captured by the first image capture device 110 and the second image capture device 120 so as to explain the overall operating principle of the image capture system 100, a description is provided with reference to FIG. 1 and FIG. 2A. FIG. 2A depicts a schematic diagram of images captured by an image capture system according to some embodiments of this disclosure. The first image capture device 110 and the second image capture device 120 are respectively configured to capture a first image 112 and a second image 122. The processing device 130 is configured to receive the first image 112 and the second image 122, and determine whether the first image 112 and the second image 122 have a same object (such as an object 500). For example, when the first image capture device 110 and the second image capture device 120 are respectively configured to capture images within different ranges of a same area or showing different angles in a same area, the first image 112 and the second image 122 probably have overlapping areas, such as an area 114 in the first image 112 and an area 124 in the second image 122. In addition, the overlapping areas probably have the object 500 that simultaneously appears in the first image 112 and the second image 122. If the processing device 130 determines that the first image 112 and the second image 122 have the same object 500, the processing device 130 is configured to track an event of the object 500. After that, the processing device 130 synchronizes timestamps of the first image 112 and the second image 122 according to the event of the object 500. For example, the event of the object may be a displacement of the object itself (such as a horizontal movement or a height change) or an interaction relationship with another object (such as a relative distance). It is noted that although for ease understanding, portions of an upper edge, a lower edge, and a right edge of the first overlapping area 114 depicted in FIG. 2A exceed a boundary of the first image 112 to facilitate understanding, the overlapping area in fact would not exceed the boundary of the image to which the overlapping area belongs. In FIG. 2A, the first overlapping area 114 actually occupies a whole right half of the first image 112. The second overlapping area 124 is also shown in a similar manner, and a description in this regard is not provided.

Therefore, the image capture system disclosed by the present disclosure can synchronize the timestamps of the images by using the event generated by the same object. Hence, as compared with the method in which all the image capture devices are connected through the Internet to synchronize clock time of the image capture devices, not only can the image capture system disclosed by the present disclosure effectively correct the time difference between the captured images, but the image capture system disclosed by the present disclosure can also significantly reduce or eliminate occurrence of discontinuous timestamps so as to maintain a high degree of synchronization between the captured images.

In one embodiment, after the processing device 130 determines that the overlapping areas of the first image 112 and the second image 122 have the same object 500, the processing device 130 tracks an event of the object 500 in the overlapping areas. After that, the processing device 130 synchronizes the timestamps of the first image 112 and the second image 122 according to the event of the object 500. For example, when the first overlapping area 114 of the first image 112 and the second overlapping area 124 of the second image 122 have the same object 500, the processing device 130 tracks an event of the object 500 in the overlapping areas.

In one embodiment, the processing device 130 calculates a difference of timestamp between the first image 112 and the second image 122 based on the event of the object 500, and synchronizes the timestamps of the first image 112 and the second image 122 according to the difference of timestamp. For example, when the event of the object 500 occurs, the processing device 130 calculates the difference of timestamp between the first image 112 and the second image 122 based on the timestamps corresponding to the event of the object 500 in the first image 112 and the second image 122 so as to synchronize the timestamps of the first image 112 and the second image 122. It should be understood that although the operation method of synchronizing the timestamps is illustrated by only using the first image 112 and the second image 122 in the above embodiment, which is merely intended to facilitate understanding the technical means of the present disclosure, and the present disclosure is not limited in this regard. For example, the image capture system 100 can be further extended to synchronize timestamps of a plurality of images captured by a plurality of image capture devices based on the above operation method of synchronizing the first image 112 and the second image 122 that serves as a basic concept.

In one embodiment, the processing device 130 synchronizes the timestamps of the first image 112 and the second image 122 in a real-time manner through an online method. For example, when the processing device 130 continuously receives the first image 112 and the second image 122 through a wired connection or a wireless connection, the processing device 130 synchronizes the timestamps of the received first image 112 and second image 122 in a real-time manner. In another embodiment, the processing device 130 synchronizes the timestamps of the first image 112 and the second image 122 through an offline method. For example, after the processing device 130 completely receives the first image 112 and the second image 122 through a wired connection or a wireless connection, the processing device 130 then synchronizes the timestamps of the first image 112 and second image 122. In greater detail, the first image 112 and the second image 122 received by the processing device 130 can be stored in a storage device (not shown in the figure). The first image 112 and the second image 122 can be obtained from the storage device when previous images need to be accessed in the future, and then the processing device 130 synchronizes the timestamps of the first image 112 and second image 122. The first image 112 and the second image 122 thus synchronized have nearly no or completely no time difference. As a result, it is very convenient for users to search for objects to be found from the images captured by a plurality of image capture devices.

With additional reference to FIG. 2A, as mentioned previously, the first image 112 has the first overlapping area 114, the second image 122 has the second overlapping area 124, and the first overlapping area 114 and the second overlapping area 124 have the same object 500. When the processing device 130 determines that the first image 112 and the second image 122 have the same object 500, the processing device 130 is configured to track an event of the object 500. In one embodiment, the processing device 130 tracks the event of the object 500 in the overlapping areas based on an instantaneous acceleration change or an instantaneous height change of the object 500. That is, the event of the object 500 may be the instantaneous acceleration change or the instantaneous height change of the object 500. For example, the instantaneous acceleration change of the object 500 may be the starting and stopping of the movement of the object or the change of moving direction. If the object 500 is a human being, it may be, for example, that the human being changes to walking from standing still, changes to turning during walking, changes to standing still from walking, etc. The instantaneous height change of the object 500 may be a height rise or a height fall. If the object 500 is a human being, it may be, for example, that the human being changes to squatting from standing, changes to standing from squatting, changes to raising his hand, changes to bend over, etc.

Figure 4:
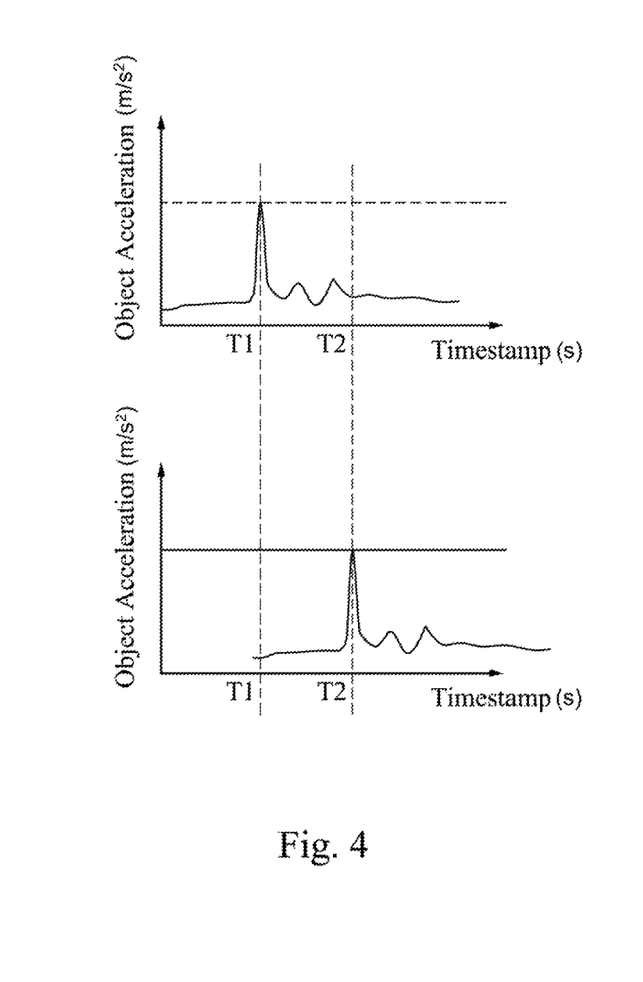
FIG. 4 depicts a schematic diagram of synchronizing timestamps by utilizing an object acceleration event according to some embodiments of this disclosure.

A description is provided with reference to FIG. 4. FIG. 4 depicts a schematic diagram of synchronizing timestamps by utilizing an object acceleration event according to some embodiments of this disclosure. As shown in FIG. 4, the horizontal axis is the timestamp, and the image capture device will use the timestamp to record the captured time of the image for each captured images according to its internal clock time. The upper half shows the relationship between a timestamp of an image of the object 500 captured by the first image capture device 110 and acceleration. It can be seen that the acceleration of the object 500 has an instantaneous change at a timestamp T1 and rises abruptly to 20 m/s$^2$ and then abruptly drops. The instantaneous change of acceleration may be regarded as a first event. The lower half shows the relationship between a timestamp of an image of the same object 500 captured by the second image capture device 120 and acceleration. It can be seen that the acceleration of the object 500 has an instantaneous change at a timestamp T2 and rises abruptly to 20 m/s$^2$ and then abruptly drops. The processing device 130 can find that this instantaneous change of acceleration and the first event are a same event after comparison. The processing device 130 then can calculate a difference value between the timestamp T1 at which the first event of the first image 112 occurs and the timestamp T2 at which the first event of the second image 122 occurs so as to synchronize the timestamps of the first image 112 and the second image 122.

Figure 2B:
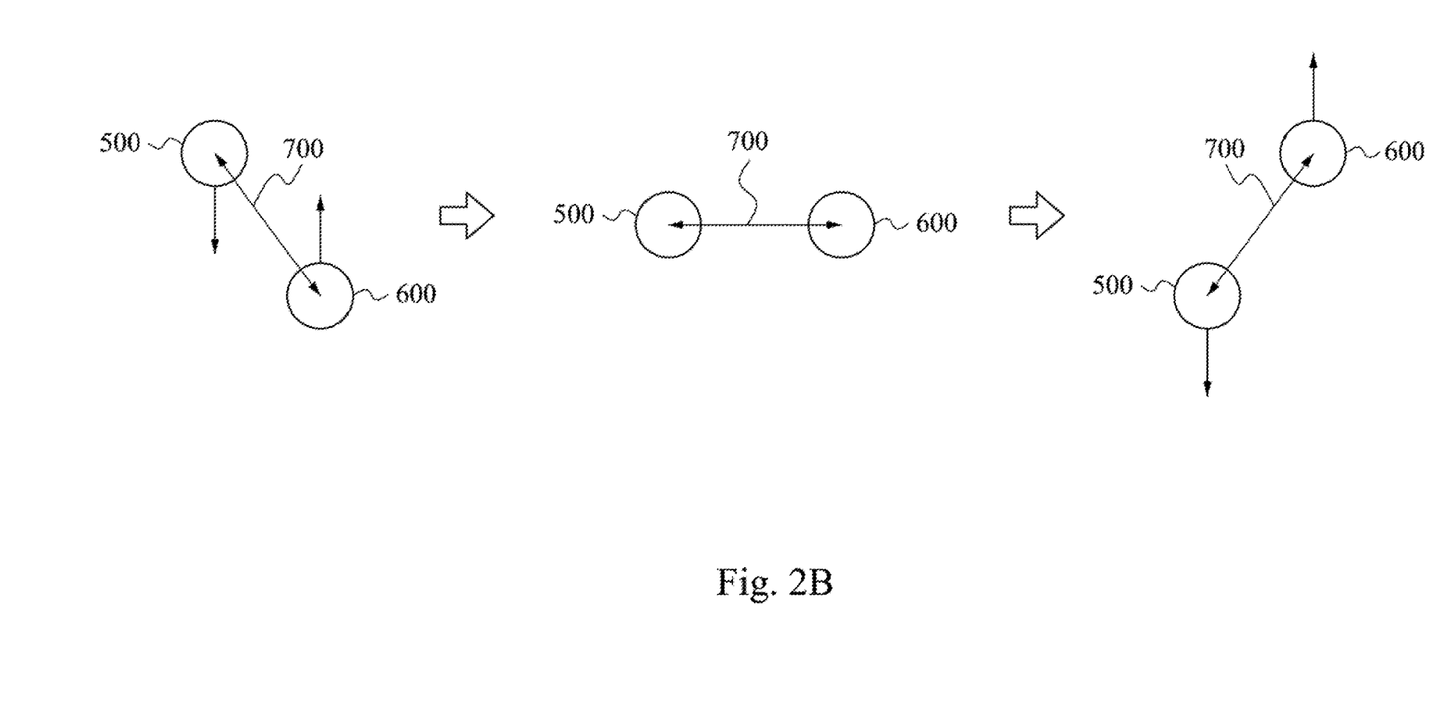
FIG. 2B depicts a schematic diagram of moving relationships between objects according to some embodiments of this disclosure.

FIG. 2B depicts a schematic diagram of moving relationships between objects according to some embodiments of this disclosure. As shown in FIG. 2B, the processing device 130 tracks an event of the object 500 in the overlapping areas based on a relative distance 700 between the object 500 and an object 600. For example, when the relative distance 700 between the object 500 and the object 600 is equal to or lower than a predetermined threshold value, the processing device 130 determines that the event of the object 500 occurs so that the processing device 130 synchronizes the timestamps of the first image 112 and the second image 122 according to the event of the object 500. For example, when the timestamps of the first image 112 and the second image 122 are synchronized through an offline method, the processing device 130 determines that an event of the object 500 occurs if the relative distance 700 between the object 500 and the object 600 is a local minimum, that is, if the two objects are closest to each other. The processing device 130 then synchronizes the timestamps of the first image 112 and the second image 122 according to the event of the object 500. It should be understood that the relative distance 700 and the determination of occurrence of the event of the object 500 are only intended to be illustrative and are not intended to limit the embodiments of the present disclosure.

Figure 3:
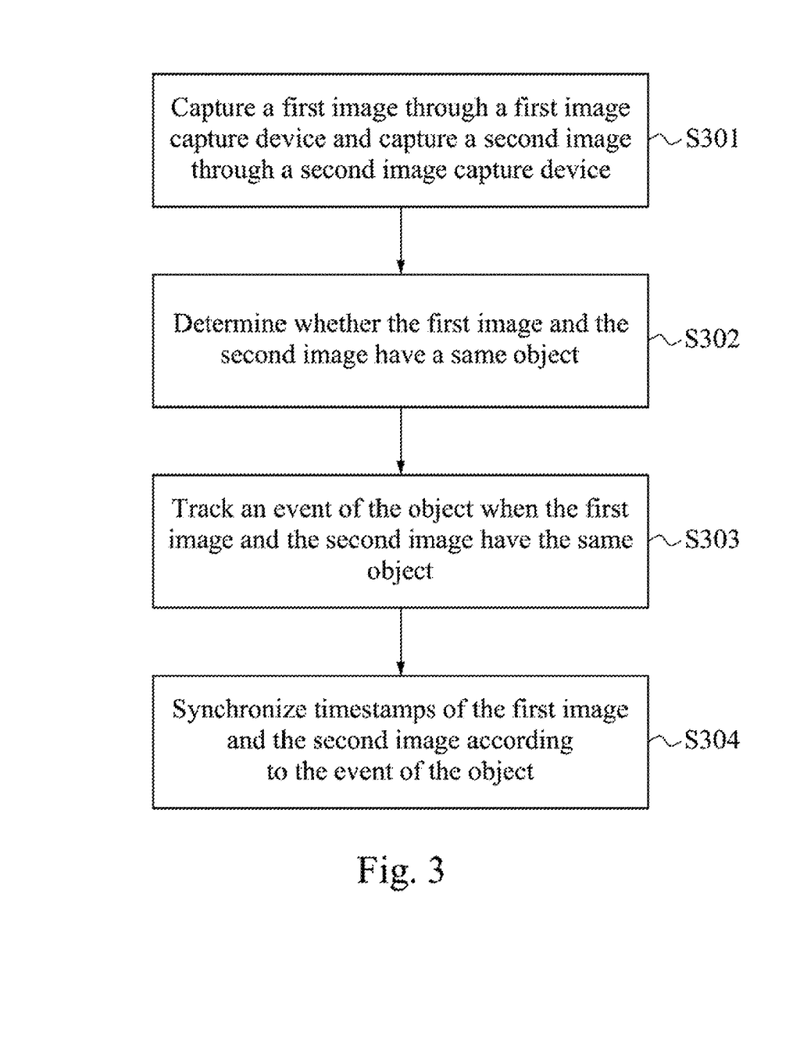
FIG. 3 depicts a flowchart of a method for synchronizing an image according to some embodiments of this disclosure.

FIG. 3 depicts a flowchart of a method 300 for synchronizing an image according to some embodiments of this disclosure. In one embodiment, the method 300 for synchronizing the image can be executed by the above image capture system 100, but the present disclosure is not limited in this regard. In order to facilitate the understanding of the method 300 for synchronizing the image, the image capture system 100 is taken as an example for implementing the method 300 for synchronizing the image. As shown in FIG. 3, first, the first image 112 and the second image 122 are captured respectively through the first image capture device 110 and the second image capture device 120 in step S301. In step S302, the processing device 130 is used to determine whether the first image 112 and the second image 122 have the same object 500. In step S303, the processing device 130 is used to track an event of the object 500 when the first image 112 and the second image 122 have the same object 500. Finally, in step S304, the processing device 130 is used to synchronize timestamps of the first image 112 and the second image 122 according to the event of the object 500.

A description is provided with reference to step S303, in one embodiment, the processing device 130 is used to track the event of the object 500 in overlapping areas of the first image 112 and the second image 122 when the first image 112 and the second image 122 have the same object 500. For example, when the first image 112 and the second image 122 have the same object 500, the object 500 will respectively appear in the first overlapping area 114 in the first image 112 and the second overlapping area 124 in the second image 122.

A description is provided with reference to step S303, in another embodiment, the processing device 130 tracks the event of the object 500 in the overlapping areas based on an instantaneous acceleration change or an instantaneous height change of the object 500. That is, the event of the object 500 may be the instantaneous acceleration change or the instantaneous height change of the object 500. For example, the instantaneous acceleration change of the object 500 may be the starting and stopping of the movement of the object or the change of moving direction. If the object 500 is a human being, it may be, for example, that the human being changes to walking from standing still, changes to turning during walking, changes to standing still from walking, etc. The instantaneous height change of the object 500 may be a height rise or a height fall. If the object 500 is a human being, it may be, for example, that the human being changes to squatting from standing, changes to standing from squatting, changes to raising his hand, changes to bend over, etc. In another embodiment, the processing device 130 is used to track the event of the object in the overlapping areas based on the relative distance 700 between the object 500 and the object 600. For example, the processing device 130 is used to determine that the event of the object 500 occurs at a moment where the relative distance between the object 500 and the object 600 is the smallest when encountering each other so as to synchronize the timestamps of the first image 112 and the second image 122 according to the event of the object 500. In addition, for example, when the timestamps of the first image 112 and the second image 122 are synchronized through an offline method, the processing device 130 determines that the event of the object 500 occurs if the relative distance 700 between the object 500 and the object 600 is a local minimum, that is, if the two objects are closest to each other. The processing device 130 then synchronizes the timestamps of the first image 112 and the second image 122 according to the event of the object 500. It should be understood that the relative distance 700 and the determination of occurrence of the event of the object 500 are only intended to be illustrative and are not intended to limit the embodiments of the present disclosure.

A description is provided with reference step S304, in one embodiment, the processing device 130 further calculates a difference of timestamp between the first image 112 and the second image 122 based on the event of the object 500, and synchronizes the timestamps of the first image 112 and the second image 122 according to the difference of timestamp. For example, when the event of the object 500 occurs, the processing device 130 is used to calculate the difference of timestamp between the first image 112 and the second image 122 based on the timestamps corresponding to the event of the object 500 in the first image 112 and the second image 122 so as to synchronize the timestamps of the first image 112 and the second image 122. It should be understood that although the operation method of synchronizing the timestamps is illustrated by only using the first image 112 and the second image 122 in the above embodiment, which is merely intended to facilitate understanding the technical means of the present disclosure, and the present disclosure is not limited in this regard. For example, the method 300 for synchronizing the image can be further extended to synchronize timestamps of a plurality of images captured by a plurality of image capture devices based on the above operation method of synchronizing the first image 112 and the second image 122 that serves as a basic concept.

With additional reference to step S304, in another embodiment, the timestamps of the first image 112 and the second image 122 can be synchronized in a real-time manner through an online method. For example, after the processing device 130 is used to continuously receive the first image 112 and the second image 122 through a wired connection or a wireless connection, the processing device 130 is further used to synchronize the timestamps of the received first image 112 and second image 122 in a real-time manner. In another embodiment, the timestamps of the first image 112 and the second image 122 can be synchronized through an offline method. For example, after the processing device 130 is used to completely receive the first image 112 and the second image 122 through a wired connection or a wireless connection, the processing device 130 is then further used to synchronize the timestamps of the first image 112 and second image 122. In greater detail, the first image 112 and the second image 122 received by the processing device 130 can be stored in a storage device (not shown in the figure). The first image 112 and the second image 122 can be obtained from the storage device when previous images need to be accessed in the future, and then the processing device 130 synchronizes the timestamps of the first image 112 and second image 122. The first image 112 and the second image 122 thus synchronized have nearly no or completely no time difference. As a result, it is very convenient for users to search for objects to be found from the images captured by a plurality of image capture devices.

It is noted that in the above embodiments the processing device 130 receives the first image 112 captured by the first image capture device 110 and the second image 122 captured by the second image capture device 120, and synchronizes the timestamps of the first image 112 and second image 122 according to the above description. However, in another embodiment, the processing device 130 may receive first metadata (such as a coordinate position, a height, a color, or some other characteristic value of the object in the first image 112) that is obtained by using the first image capture device 110 to analyze the first image 112 captured by itself in advance and receive second metadata (such as a coordinate position, a height, a color, or some other characteristic value of the object in the second image 122) that is obtained by using the second image capture device 120 to analyze the second image 122 captured by itself in advance. Then, the processing device 130 tracks an event of a same object and synchronizes the timestamps of the first image 112 and the second image 122 according to the event tracking result as described above when the first image 122 and the second image 122 are determined to have the same object based on the metadata.

It is noted that the synchronization of the timestamps according to the present disclosure is achieved by modifying the timestamp of the first image 112 or the second image 122 at an end of the processing device 130 instead of modifying the clock time in the first image capture device 110 or the clock time in the second image capture device 120.

It is also noted that the processing device 130 may be integrated into the first image capture device 110 or the second image capture device 120.

According to the above embodiments, the processing device disclosed by the present disclosure determines whether the captured images have the same object after receiving the images or metadata captured by different image capture devices. If the captured images are determined to have the same object, the processing device tracks the object and synchronizes the timestamps of the captured images according to an event of the object that subsequently occurs. Therefore, as compared with the method in which all the image capture devices are connected through the Internet to synchronize the timestamps, not only can the image capture system disclosed by the present disclosure effectively correct the time difference between the captured images, but the image capture system disclosed by the present disclosure can also significantly reduce or eliminate the occurrence of discontinuous timestamps so as to maintain a high degree of synchronization of timestamps between the captured images.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An image capture system comprising:
   a first image capture device configured to capture a first image;
   a second image capture device configured to capture a second image; and
   a processing device electrically connected to the first image capture device and the second image capture device, the processing device being configured to receive first information transmitted from the first image capture device and second information transmitted from the second image capture device, and determines whether the first image and the second image have a same object based on the first information and the second information, if the processing device determines that the first image and the second image have the same object, the processing device synchronizes timestamps of the first image and the second image according to an event of the object,
   wherein the event of the object includes at least one of the following: an instantaneous acceleration change of the object, an instantaneous height change of the object, moving direction change of the object, a relative distance between the object and a relative object equal to or lower than a predetermined threshold, and an occurrence of a local minimum of the relative distance.

2. The image capture system of claim 1, wherein the first information is the first image, the second information is the second image, and wherein each of the first image and the second image has an overlapping area, and wherein the processing device tracks the event of the object in the overlapping areas after the processing device determines that the first image and the second image have the same object, and then synchronizes the timestamps of the first image and the second image according to the event of the object.

3. The image capture system of claim 2, wherein the processing device calculates a difference of timestamp between the first image and the second image based on the event of the object, and synchronizes the timestamps of the first image and the second image according to the difference of timestamp.

4. The image capture system of claim 1, wherein the first information is first metadata that is obtained by using the first image capture device to analyze the first image, and the second information is second metadata that is obtained by using the second image capture device to analyze the second image.

5. The image capture system of claim 4, wherein the processing device calculates a difference of timestamp between the first image and the second image based on the event of the object, and synchronizes the timestamps of the first image and the second image according to the difference of timestamp.

6. The image capture system of claim 1, wherein the processing device calculates a difference of timestamp between the first image and the second image based on the event of the object, and synchronizes the timestamps of the first image and the second image according to the difference of timestamp.

7. A method for synchronizing an image comprising:
   capturing a first image through a first image capture device and capturing a second image through a second image capture device;
   determining whether the first image and the second image have a same object based on first information and second information;
   tracking an event of the object when the first image and the second image have the same object; and
   synchronizing timestamps of the first image and the second image according to the event of the object,
   wherein the event of the object includes at least one of the following: an instantaneous acceleration change of the object, an instantaneous height change of the object, moving direction change of the object, a relative distance between the object and a relative object equal to or lower than a predetermined threshold, and an occurrence of a local minimum of the relative distance.

8. The method for synchronizing the image of claim 7, wherein the first information is the first image, the second information is the second image, and wherein each of the first image and the second image has an overlapping area, and wherein tracking the event of the object when the first image and the second image have the same object comprises:
   tracking the event of the object in the overlapping areas.

* * * * *